United States Patent [19]
Yoon

[11] Patent Number: 5,766,452
[45] Date of Patent: Jun. 16, 1998

[54] WATER PURIFIER HAVING CONTROL VALVE FOR DISCHARGING WASTE WATER

[75] Inventor: Deok-Joong Yoon, Suwon, Rep. of Korea

[73] Assignee: Samsung Electronics Co., Ltd., Suwon, Rep. of Korea

[21] Appl. No.: 714,349

[22] Filed: Sep. 16, 1996

[51] Int. Cl.$^6$ .............................. B01D 61/12; B01D 36/02
[52] U.S. Cl. ...................... 210/137; 210/259; 210/321.65
[58] Field of Search ................................. 210/85, 90, 97, 210/134, 135, 137, 143, 195.2, 257.2, 259, 541, 542, 650, 652, 321.65, 109, 282, 323.1

[56] References Cited

U.S. PATENT DOCUMENTS

| | | | |
|---|---|---|---|
| 5,082,557 | 1/1992 | Grayson et al. | 210/257.2 |
| 5,096,574 | 3/1992 | Birdsong et al. | 210/90 |
| 5,122,265 | 6/1992 | Mora et al. | 210/257.2 |
| 5,454,944 | 10/1995 | Clack | 210/257.2 |
| 5,503,735 | 4/1996 | Vinas et al. | 210/137 |

*Primary Examiner*—Joseph W. Drodge
*Attorney, Agent, or Firm*—Burns, Doane, Swecker & Mathis, L.L.P.

[57] ABSTRACT

A water purifier includes a main body on which filters are mounted for receiving and purifying water. One of the filters is a membrane filter which produces waste water discharged through a discharge conduit. The discharge conduit is connected to an inlet of a discharge valve mounted on the main body. The discharge valve also includes an outlet for discharging the waste water received from the inlet. The discharge valve includes a passage and an additional conduit communicating the inlet with the outlet. The passage is opened and closed by a manually operated valve body, and the additional conduit is opened and closed by a solenoid valve.

11 Claims, 4 Drawing Sheets

WATER PURIFIER HAVING CONTROL VALVE FOR DISCHARGING WASTE WATER

BACKGROUND OF THE INVENTION

1. Field of the Invention

The present invention relates to a control valve apparatus for controlling the discharge of concentrated water quantity from a water purifier.

2. Description of the Prior Art

A reverse osmosis water purifier used conventionally, as illustrated in FIG. 1, serves to supply tap water into a water supply tube 5 through an adapter 3 connected to a faucet 1 and the tap water flowing in the water supply tube 5 passes through a pre-process filtering apparatus 7 of a water purifier to thereafter be separated from various harmful organic chemical materials such as chlorine substances and the like.

The water having passed the pre-process filtering apparatus 7 is raised in pressure to a predetermined level according to activation of a pressure pump (not shown) to thereafter be sent to a membrane filtering apparatus 9.

The membrane filtering apparatus 9 serves to eliminate various heavy metals, cancer-causing substances, bacteria and the like.

The water having passed the membrane filtering apparatus 9 passes through a post-process filtering apparatus 11 to thereafter be removed of odor, toxic gas and the like and passes through a purified water exit tube 13 connected at one side of the post-process filtering apparatus 11 and is infused into a purified water tank 15 to thereafter be stored therein.

The purified water stored in the purified water tank 15 is discharged outside according to activation of a water discharge valve (not shown).

Meanwhile, concentrated water (waste water) containing heavy metals, cancer-causing substances, bacteria and the like not having passed the membrane filtering apparatus 9 is discharged outside, as illustrated in FIG. 2, through a drainage tube 17 and through a control valve 19 threaded to a lower side of the adapter 3 connected to the faucet 1.

When the control valve 19 is turned in one direction a threaded unit 19a formed at a periphery of the control valve 19 is displaced to thereby allow a guide passage (not shown) to form between a sealing unit 21 and the control valve 19.

The concentrated water having passed the guide passage is discharged outside through a drainage hole 19b of an approximate T shape.

Meanwhile, when the control valve 19 is turned in the opposite direction, a gap between the sealing unit 21 and the control valve is further narrowed to thereby lessen discharge of the concentrated water, and when the valve 19 is completely turned, the concentrated water discharge is stopped.

However, there is a problem in the conventional water purifier thus constructed, in that a control valve is only adjusted manually, so that discharged quantity of the concentrated water is determined by position of the control valve, thereby preventing the concentrated water from being smoothly discharged according to the quantity of water being purified.

There is another problem in that a control valve apparatus of the concentrated water is connected to a faucet supplying the tap water of the water purifier, so that there is an inconvenience in manipulating same.

SUMMARY OF THE INVENTION

Accordingly, the present invention is disclosed to solve the aforementioned problem and it is an object of the present invention to provide a control valve apparatus which can be easily mounted to one side of a body.

It is another object of the present invention to provide a control valve apparatus which can smoothly control the quantity of concentrated water discharged through a membrane filtering apparatus of a water purifier.

In accordance with the object of the present invention, there is provided a control valve apparatus, the apparatus comprising: a control valve mounted at one side of a body of the water purifier for controlling the concentrated water quantity discharged through a membrane filtering apparatus thereof.

In accordance with another object of the present invention, there is provided a control valve apparatus comprising:

- a control valve mounted at one side of a body of the water purifier for controlling the concentrated water quantity discharged through a membrane filtering apparatus thereof;
- a solenoid valve for being opened and closed to selectively discharge the concentrated water through a first discharge passage of a first discharge unit formed at a cylinder; and
- a coupling pipe for discharging the concentrated water infused through a second discharge passage of a second discharge unit and the first discharge passage of the first discharge unit of the cylinder.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF A PREFERRED EMBODIMENT OF THE INVENTION

Now, the preferred embodiment of the present invention will be described in detail with reference to the accompanying drawings.

The control valve apparatus for discharged concentrated water quantity in a water purifier according to the present invention is provided with a control valve 100 at one side of a body 2 of the water purifier (see FIG. 4) by way of fastening means (described later).

Figure 1:
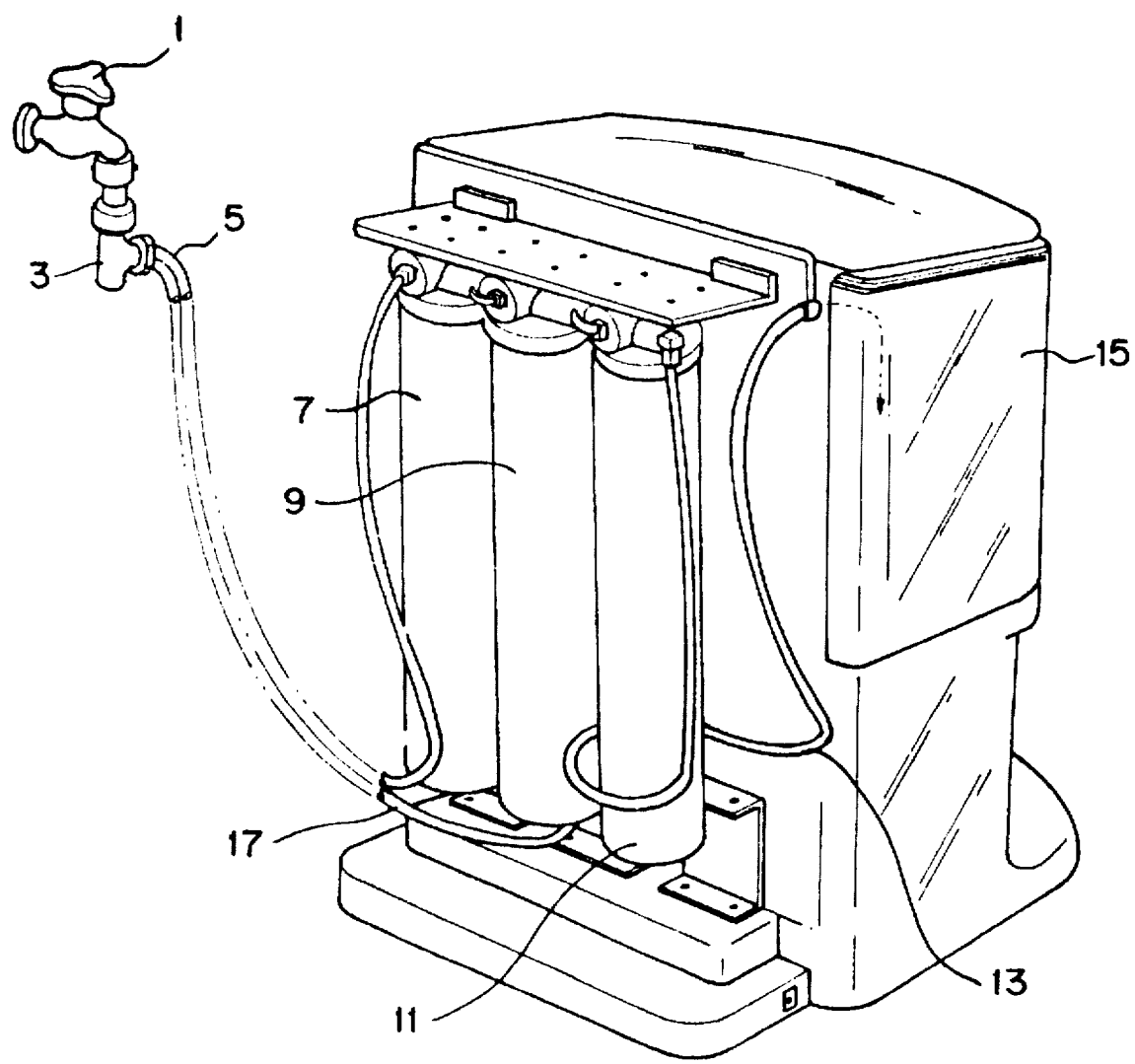
FIG. 1 is a rear perspective view for illustrating a reverse osmosis water purifier of a conventional water purifier.
Figure 2:
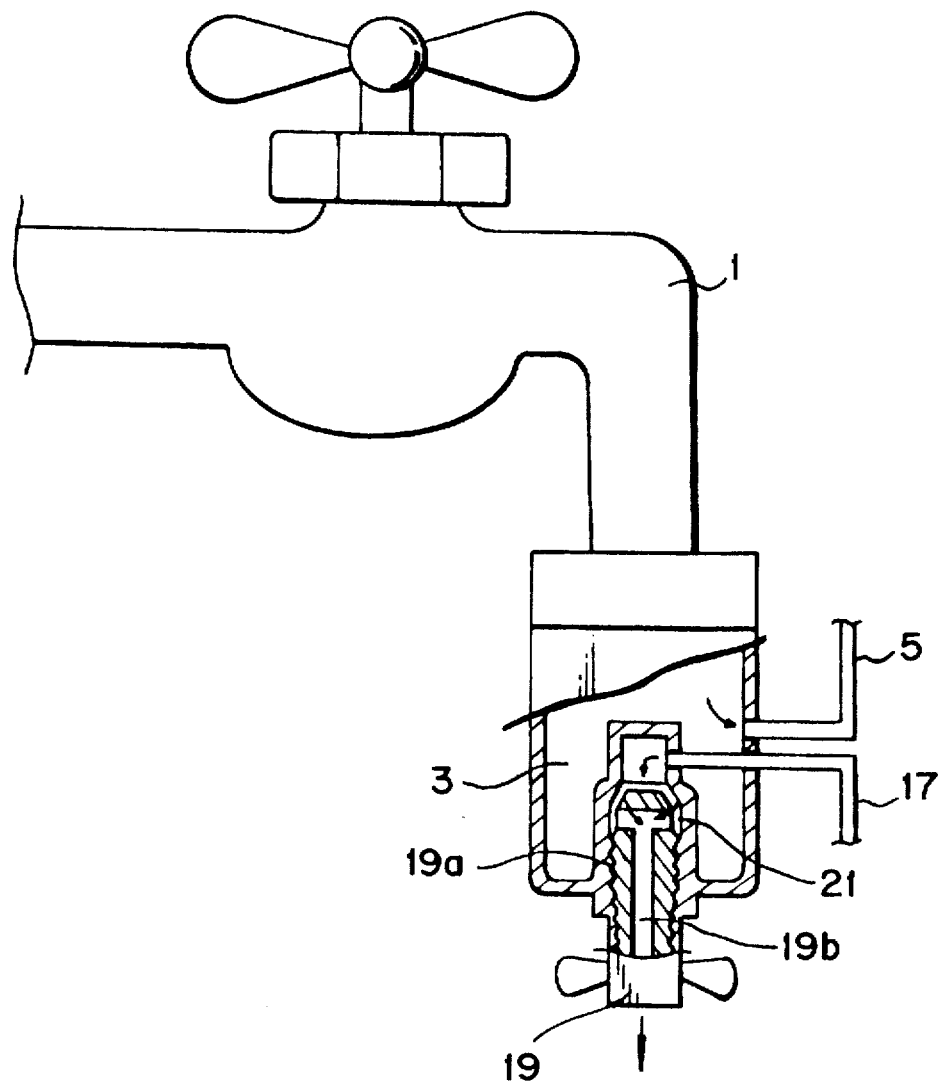
FIG. 2 is a sectional view for illustrating a control valve apparatus of the conventional reverse osmosis water purifier.
Figure 3:
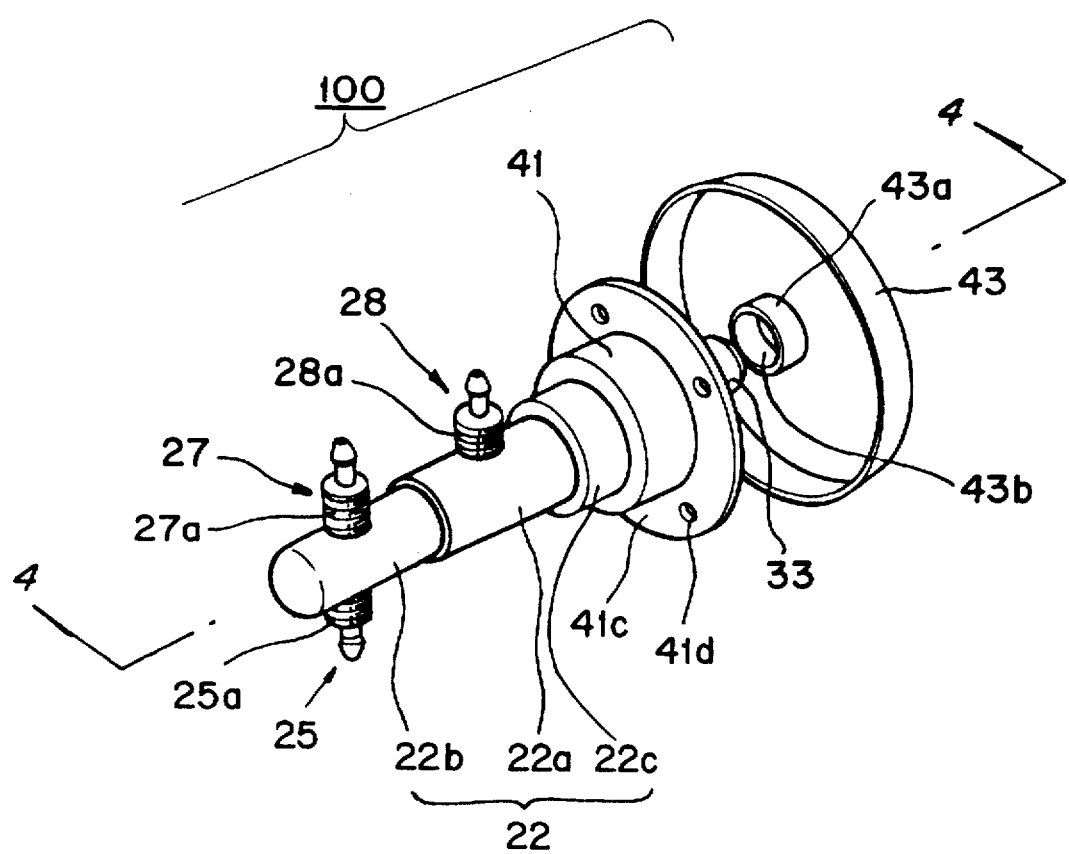
FIG. 3 is a perspective view of a control valve apparatus according to an embodiment of the present invention.
Figure 4:
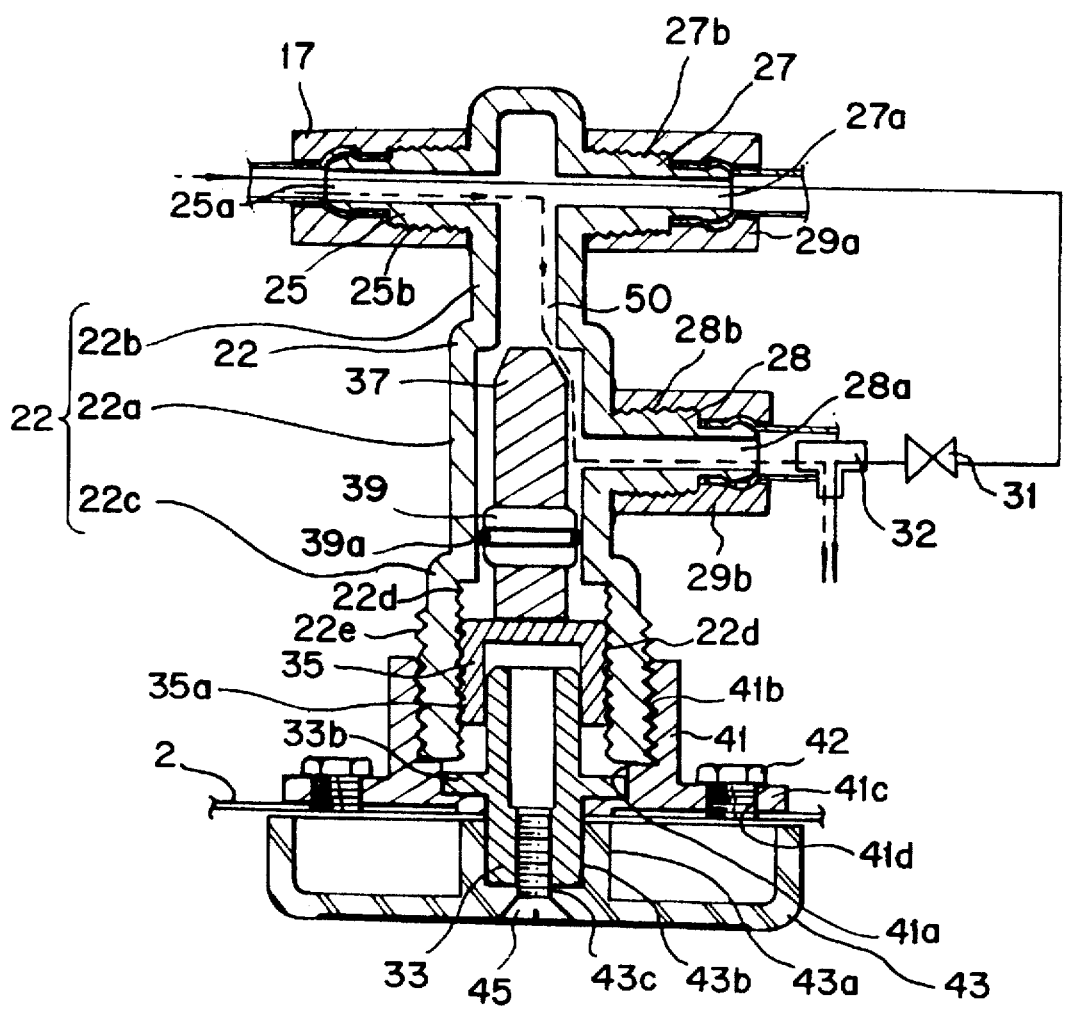
FIG. 4 is a sectional view taken along line 4—4 in FIG. 3.

The control valve 100 of discharged concentrated water quantity includes, as illustrated in FIG. 3 and 4, a cylinder 22, a valve body 37 disposed for horizontal movement in the cylinder 22 and for forming a guide passage 50 between a small-diameter unit 22b and a medium-diameter unit 22a, a coupling member 41 screwed to a large-diameter unit 22c of the cylinder and attached to the body 2 of the water purifier, a clutch member 33 fixed at one and thereof to a cylindrical unit 35 of the valve body 37 and inserted at a middle section thereof into a guide groove 41a formed in the coupling member 41 to thereby control horizontal movement of the valve body 37, and a control knob 43 fixed at the other end of the clutch member 33 to enlarge or reduce a gap of the guide passage 50 by horizontally moving the valve body 37.

In the control valve apparatus according to the present invention, when the control valve 100 of the discharged concentrated water quantity is manually manipulated, the concentrated water infused through an infuse passage 25a at an infuse unit 25 as illustrated in dotted arrow in FIG. 4, is discharged through a second discharge passage 28a at a second discharge unit 28 via a coupling pipe 32.

Meanwhile, the control valve 100 can be automatically manipulated, by a solenoid valve 31 which is activated by a control unit (not shown) to thereby open or close a first discharge passage 27a of the first discharge unit 27.

The control valve apparatus includes a coupling pipe 32 for discharging the concentrated water received from the first discharge passage 27a during automatic manipulation. The solenoid valve 31 is opened to introduce into the coupling pipe 32 the concentrated water from the first discharge passage 27a during automatic manipulation and is closed to prevent the concentrated water from being discharged during manual manipulation.

The coupling pipe 32 is as constructed as to have a T shape, so that the concentrated water can be infused from two directions (in other words, the first discharge passage 27a and the second discharge passage 28a to thereafter be discharged during either manual or automatic manipulations of the control valve 100.

Meanwhile, the valve body 37 is provided with a sealing member 39 so that the concentrated water introduced through the infuse passage 25a is prevented from being drained out toward the control knob 43 through the middle-diameter unit 22a and the large-diameter unit 22c of the cylinder.

The sealing member 39 is provided at a periphery thereof with an O-ring (39a).

Although one O-ring (39a) is used in the present invention, a plurality of O-rings can be used according to the situation.

The clutch member 33 is formed at a periphery thereof with a flange unit 33b for energizing the guide groove 41a formed at an inner floor surface of the coupling member 41 so that the clutch member 33 should not be moved outside of the body 2 of the water purifier beyond a predetermined position during rotation of the control knob 43.

The control knob 43 is circularly shaped whereby at a central portion thereof, there is arranged a boss unit 43a.

The boss unit 43a is formed at an inner side thereof with a groove 43b for the clutch member 33 to be inserted thereinto.

The groove 43b is formed with a fastening hole 43c so as to be attached to the clutch member 33 by way of a fastening screw 45.

The cylinder 22 is connected to a drainage pipe 17 connected at to a membrane filtering apparatus 9, and is formed at one side of the small-diameter unit 22b with the infuse unit 25 having the infuse passage 25a in order to infuse the concentrated water discharged from the membrane filtering apparatus 9.

The small-diameter unit 22b is formed at the other side thereof with the first discharge unit 27 having the discharge passage 27a in order to discharge the concentrated water introduced through the infuse passage 25a of the infused unit 25.

Meanwhile, the middle-diameter unit 22a of the cylinder 22 is formed at one side thereof with the second discharge unit 28 having the discharge passage 28a in order to discharge the concentrated water infused through the infuse passage 25a formed at the infuse unit 25 during the manual manipulation.

Furthermore, the large-diameter unit 22c integrally formed with the cylinder 22 is formed at an inner periphery thereof with a thread unit 22d for being meshed with another thread unit 35a formed at a periphery of the cylindrical unit 35 as illustrated in FIG. 4.

The large-diameter unit 22c is formed at an outer periphery thereof with a thread unit 22e meshed with a thread unit 41b formed at an inner periphery of the coupling member 41.

The coupling member 41 is formed at a flange unit 41c thereof with a plurality of through holes 41b so as to fix the coupling member 41 to the body 2 of the water purifier by way of fastening means 42.

Furthermore, the infuse unit 25, and the first and the second discharge units 27 and 28 are of the same shapes, and formed at peripheries thereof with thread units 25b, 27b and 28b to prevent drainage pipes 17, 29a and 29b from being detached therefrom by pressure of the concentrated water when the drainage pipe 17 and connection drainage pipes 29a and 29b are connected thereto.

Now, the operational effect of the control valve apparatus according to the embodiment of the present invention thus constructed will be described.

Throughout the drawing, like reference numerals and symbols are used for designation of like or equivalent parts or portions, for simplicity of illustration and explanation.

First of all, a manual manipulation of the control valve 100 will be described.

The faucet water is purified while passing through a pre-process filtering apparatus 7, a membrane filtering apparatus 9 and a post-process filtering apparatus.

The water thus purified through the above processes is infused into a storage tank 15 and is disposed by way of manipulation of a water disposal valve.

Concentrated water (waste water) not having passed the membrane filtering apparatus is drained out through a drainage pipe 17 disposed underneath the membrane filtering apparatus 9.

The drainage pipe 17 disposed underneath the membrane filtering apparatus 9 is threaded into the thread unit 25b formed at a periphery of the infuse unit 25, as illustrated in FIG. 4.

The concentrated water not having passed the membrane filtering apparatus 9 is infused into the control valve 100 through the infuse passage 25a of the infuse unit 25.

When the clutch member 33 is rotated counterclockwise, the cylindrical unit 35 is retracted along the large-diameter unit 22c of the cylinder 22 and the valve body 37 fixed to the cylindrical unit 35 is retracted from an inner periphery of the small-diameter unit 22b at the cylinder 22, to thereby from a guide passage 50, for the concentrated water.

The concentrated water having passed the guide passage 50 is discharged outside along a dotted arrow path through the discharge passage 28a formed at the second discharge unit 28 and through the coupling pipe 32.

Meanwhile, when the control knob 43 is turned clockwise, the valve body 37 is also rotated and advanced to thereby narrow the guide passage 50 and to lessen the quantity of the discharged concentrated water.

Next an automatic manipulation of the control valve 100 according to the present invention will be described.

First of all, the control knob 43 is adjusted manually to close the guide passage 50.

When a large quantity of concentrated water is discharged to clean a filter (not shown) inherently disposed in the membrane filtering apparatus 9, the first discharge passage 27a of the first discharge unit 27 is opened by operation of the solenoid valve 31 according to an electrical control of a control means (not shown).

At this time, the concentrated water infused into the cylinder 22 through the infuse passage 25a of the infuse unit 25 is discharged outside along a continues arrow line in FIG. 4 through the first discharge passage 27a of the first discharge unit 27, through the connection drainage pipe 29a and the solenoid valve 31 and through the T-shape coupling pipe 32.

In the aforementioned description, explanation has been made, where the concentrated water is discharged during manual manipulation to the coupling pipe 32 through the second discharge passage 28a formed at the second discharge unit 28, and during automatic manipulation, the concentrated water is discharged to the coupling pipe 32 through the discharge passage 27a formed at the first discharge unit 27 and the solenoid valve 31.

However, it should be noted that the control knob 43 can be adjusted to a predetermined position by way of manual manipulation to thereby open the guide passage 50 to cause the concentrated water to be discharged from the coupling pipe 32 through both the first and the second discharge passages 27a and 28a.

It is preferred that a discharge ratio between the purified water and the concentrated water be adjusted at 1:4 during manual and automatic manipulations in the control valve apparatus.

By way of example, presume that the flows faucet water is assigned a value of 100, then the purified water that is used is a value of approximately 20 while the discharged concentrated water is approximately 80.

As apparent from the foregoing, there is an advantage in the control valve apparatus discharged concentrated water quantity of according to the present invention thus constructed, in that the discharged quantity of the concentrated water can be easily controlled by manual manipulation and automatic manipulation as well to thereby prolong the life the water purifier, and a control valve can be easily mounted to a body of the water purifier to thereby enable easy assembly and removal therefrom.

What is claimed is:

1. A water purifier comprising:

a main body;

filters connected to the main body for receiving water to be purified and for discharging purified water, one of the filters being a membrane filter emitting waste water through a discharge conduit; and a control valve mounted on the main body and communicating with the discharge conduit for controlling the rate of waste water discharge, the control valve including a manual actuator for opening and closing a passage for discharging the waste water, and a solenoid valve for opening and closing a conduit for discharging the waste water.

2. A water purifier comprising:

a main body;

filters connected to the main body for receiving water to be purified and for discharging purified water, one of the filters being a membrane filter emitting waste water through a discharge conduit;

a control valve mounted on the main body and including an inlet communicating with the discharge conduit, an outlet, and an additional conduit communicating the inlet with the outlet; and a solenoid valve located for opening and closing the additional conduit.

3. The water purifier according to claim 2 wherein the control valve produces a discharge ratio of 1:4 between the purified water and waste water.

4. The water purifier according to claim 2 wherein the solenoid valve is opened by a controller connected thereto.

5. The water purifier according to claim 2 wherein the control valve further includes a manually actuable valve body for opening and closing a passage extending between the inlet and outlet, the outlet being T-shaped for connecting with both the additional conduit and the passage.

6. A water purifier comprising:

a main body;

filters connected to the main body for receiving water to be purified and for discharging purified water, one of the filters being a membrane filter emitting waste water through a discharge conduit; and a control valve mounted on the main body and communicating with the discharge conduit for controlling the rate of waste water discharge, the control valve comprising a cylinder including an inlet communicating with the discharge conduit, an outlet, a valve body movably mounted in the cylinder for forming a passage communicating the inlet with the outlet, and a manual control knob operably connected to the valve body for adjusting the valve body.

7. The water purifier according to claim 6, further including an additional conduit communicating the inlet with the outlet separately from the passage, and a solenoid valve for opening and closing the additional conduit.

8. The water purifier according to claim 7 wherein the control valve includes a large-diameter unit, a middle-diameter unit, and a small-diameter unit, the large-diameter unit including an internal screw thread connected to an external screw thread of the valve body, the valve body carrying at least on seal ring engageable with an internal surface of the middle-diameter unit.

9. The water purifier according to claim 6 further including a clutch member interconnecting the knob and valve body, the clutch member being movable within the cylinder and including a flange slidably engaging a guide surface of the cylinder.

10. The water purifier according to claim 9 wherein the knob includes a groove for receiving an end of the clutch member.

11. The water purifier according to claim 10 wherein the groove communicates with a hole in the knob for receiving a screw which fastens the knob to the clutch member.

* * * * *